US012583342B2

(12) United States Patent
Vahle

(10) Patent No.: US 12,583,342 B2
(45) Date of Patent: Mar. 24, 2026

(54) CHARGING CABLE WITH CHARGING PLUG

(71) Applicant: AUDI AG, Ingolstadt (DE)

(72) Inventor: Sebastian Vahle, Landshut (DE)

(73) Assignee: AUDI AG, Ingolstadt (DE)

( * ) Notice: Subject to any disclaimer, the term of this patent is extended or adjusted under 35 U.S.C. 154(b) by 811 days.

(21) Appl. No.: 17/940,893

(22) Filed: Sep. 8, 2022

(65) Prior Publication Data

US 2023/0070884 A1 Mar. 9, 2023

(30) Foreign Application Priority Data

Sep. 9, 2021 (DE) .......................... 102021123321.6

(51) Int. Cl.
| *B60L 53/16* | (2019.01) |
| *B60L 53/18* | (2019.01) |
| *B60L 53/30* | (2019.01) |
| *H01R 13/717* | (2006.01) |

(52) U.S. Cl.
CPC .............. *B60L 53/16* (2019.02); *B60L 53/18* (2019.02); *B60L 53/30* (2019.02); *H01R 13/717* (2013.01)

(58) Field of Classification Search
CPC .......... B60L 53/16; B60L 53/18; B60L 53/30; H01R 13/717
USPC ........................................................ 320/109
See application file for complete search history.

(56) References Cited

U.S. PATENT DOCUMENTS

| | | | | | |
|---|---|---|---|---|---|
| 7,121,707 | B2 * | 10/2006 | Currie | ................ | H01R 13/7172 |
| | | | | | 362/555 |
| 8,866,440 | B2 * | 10/2014 | Ron | ....................... | H02J 7/0042 |
| | | | | | 362/276 |
| 10,069,252 | B1 * | 9/2018 | Lin | ......................... | H01R 24/28 |
| 10,153,599 | B1 * | 12/2018 | Lin | .................... | H01R 13/7175 |
| 2005/0047167 | A1 * | 3/2005 | Pederson | ................ | F21S 43/26 |
| | | | | | 362/542 |
| 2005/0057941 | A1 * | 3/2005 | Pederson | ................ | F21S 10/06 |
| | | | | | 362/542 |
| 2005/0124209 | A1 * | 6/2005 | Currie | ................ | H01R 13/7172 |
| | | | | | 439/490 |
| 2016/0039297 | A1 * | 2/2016 | Kretschmer | ............ | B60L 53/60 |
| | | | | | 439/620.21 |
| 2022/0242265 | A1 * | 8/2022 | Gerstadt | ................. | B60L 53/18 |
| 2023/0105448 | A1 * | 4/2023 | Christensen | ........... | H05B 45/50 |
| | | | | | 315/294 |
| 2023/0198189 | A1 * | 6/2023 | Vahle | ................. | H01R 13/5213 |
| | | | | | 320/109 |

FOREIGN PATENT DOCUMENTS

| | | | | | |
|---|---|---|---|---|---|
| CN | 207381651 | U | | 5/2018 | |
| CN | 208548534 | U | | 2/2019 | |
| CN | 110370967 | A | | 10/2019 | |
| CN | 223072307 | U | * | 7/2025 | |
| DE | 102011080455 | A1 | | 2/2013 | |
| DE | 102019101197 | A1 | * | 7/2019 | .............. B60L 53/18 |
| DE | 102018119623 | A1 | * | 2/2020 | ........... H01R 13/465 |
| DE | 102021125153 | A1 | * | 3/2023 | ......... H01R 13/5804 |
| KR | 20070036955 | A | | 4/2007 | |
| WO | 2013/027100 | A1 | | 2/2013 | |

\* cited by examiner

*Primary Examiner* — Suresh Memula
(74) *Attorney, Agent, or Firm* — Seed Intellectual Property Law Group LLP

(57) ABSTRACT

A charging cable is provided having a charging plug for electrically driven motor vehicles. A method for its operation is also provided.

10 Claims, 1 Drawing Sheet

CHARGING CABLE WITH CHARGING PLUG

TECHNICAL FIELD

Embodiments of the present invention relate to a charging cable having a charging plug for electrically driven motor vehicles (battery electric vehicle or BEV, plug-in hybrid electric vehicle or PHEV) and a method for its operation.

DESCRIPTION OF THE RELATED ART

Charging cables having a charging plug are known, serving for charging of PHEV and BEV vehicles. The charging cable is either part of the charging column or the charging column has only a single charging receptacle and the vehicle's own charging cable is used as the charging cable. Sometimes the charging cable in an existing plug connection with the charging receptacle is relatively far away from the car. Depending on the position of the charging receptacle on the car, this may lead to a potential danger for road users, especially when the charging receptacle is located on the left side of the vehicle and the charging cable extends onto the road or a bicycle path. The danger of other road users not noticing the charging cable or the charging plug is of course especially great in the darkness.

From WO 2013/027 100 A1 there is known a charging cable whose surface contains a luminous material. When an electric vehicle is being charged at night, the surface of the charging cable lying on the ground emits light due to the activity of the luminous compound.

CN 208 548 534 U discloses a charging plug with an auxiliary illumination and a status indicator. The charging plug comprises a handle, a mounting piece, a locking pin and an illumination part, and the illumination part is fastened to the mounting piece. The illumination part depending on the current use of the charging plug can indicate a position, a state of charge, or a state of illumination of the charging plug.

From DE 10 2011 080 455 A1 there is known a plug of a charging cable for an electric vehicle which is outfitted with luminous means which facilitate the inserting of the plug into an electric vehicle or a charging column even during poor visibility, such as darkness at a non-illuminated parking place. The plug can be used like a flashlight in order to assist in the proper inserting. The activation of the illumination is done in this case optionally manually or automatically by sensors, for example motion detectors, acceleration sensors, or contact sensors.

BRIEF SUMMARY

Some embodiments provide devices and methods which lessen the danger that other road users who pass by in the immediate vicinity of the vehicle being charged during a charging process will be injured or suffer an accident.

Some embodiments include a charging cable having a charging plug for a car (BEV, PHEV), wherein the charging plug comprises at least one integrated warning light and a brightness sensor which is adapted to measure the ambient brightness and to activate the at least one warning light of the charging plug upon falling below a limit value.

An active illumination is integrated in the charging plug of the charging cable in the form of at least one warning light. In one embodiment, the warning light comprises a halogen spotlight. In another embodiment, the warning light comprises at least one light-emitting diode (LED). In one embodiment, the power supply of the active illumination comes via a separate or existing pole on the charging plug. In another embodiment, the power supply of the active illumination comes via a separate plug connection with the car. In yet another embodiment, the power supply of the active illumination comes via a battery integrated in the charging plug.

The illumination is done only upon falling below a certain brightness. For this, the brightness is measured by means of a brightness sensor in the charging plug and upon falling below a limit value the illumination of the charging plug is activated. In another embodiment, a brightness sensor of a car connected to the charging cable is used to control the active illumination of the charging plug.

In one embodiment, the charging cable additionally comprises a warning cover sleeve which is movable along the entire length of the charging cable. In one embodiment, the charging cable comprises a warning cover sleeve which is variable in its length and which can be moved along the entire length of the charging cable, so that an especially dangerous location can be pointed out in this way. In one embodiment, the warning cover of the sleeve comprises a multicolored textile. Thanks to the color scheme (for example, black/yellow or white/red), a warning effect is achieved. In one embodiment, the warning cover sleeve can be secured by two or more velcro straps in the desired position on the charging cable.

Some embodiments include a method for charging an electric vehicle making use of the charging cable with a charging plug as described herein. At least one warning light integrated in the charging plug is activated when the ambient brightness is less than a given limit value. In one embodiment of the method, a warning cover sleeve of the charging cable is moved to a position of the charging cable where the charging cable constitutes a particularly dangerous place for passers-by, and it is secured there.

Thanks to the additional warning light on the charging plug and the warning cover sleeve on the charging cable, other road users can be made aware of a potential danger site. Further benefits and embodiments will emerge from the description and the accompanying drawings.

Of course, the above mentioned features and those yet to be explained in the following can be used not only in the particular indicated combination, but also in other combinations or standing alone, without leaving the scope of the present disclosure.

BRIEF DESCRIPTION OF THE SEVERAL VIEWS OF THE DRAWINGS

Embodiments are illustrated in the accompanying drawings and shall be described further with reference to the drawings.

DETAILED DESCRIPTION

Figure 1:
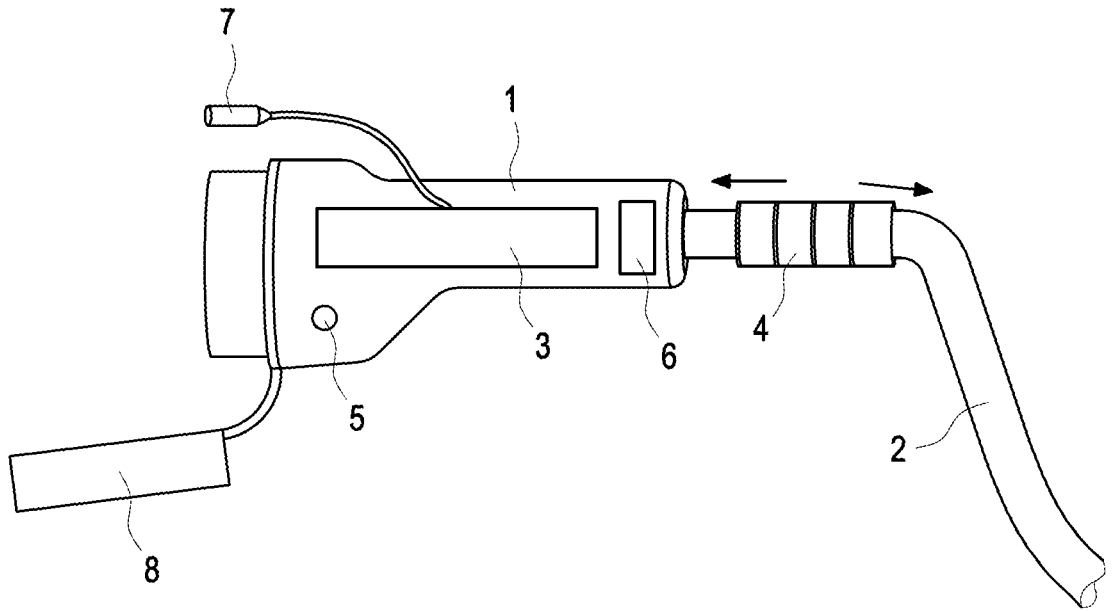
FIG. 1 shows a schematic representation of one embodiment of a charging cable with charging plug.

FIG. 1 shows schematically one embodiment of the charging cable 2 with charging plug 1. A warning light 3 is integrated in the charging plug 1. A brightness sensor 5 in the charging plug measures the ambient brightness and activates the warning light 3 upon falling below a given limit value. In the embodiment shown, the power supply of the warning light 3 comes either via a separate plug connection 7 at the charging socket of the vehicle being charged, or via a battery located in the battery compartment 6. A cap 8 movably arranged on the charging plug 1 is intended for protection of the pins of the charging plug 1 when not in use. The charging cable 2 has a warning cover sleeve 4, which can be moved along the entire length of the charging cable 2, as indicated by arrows in the drawing.

Figure 2:
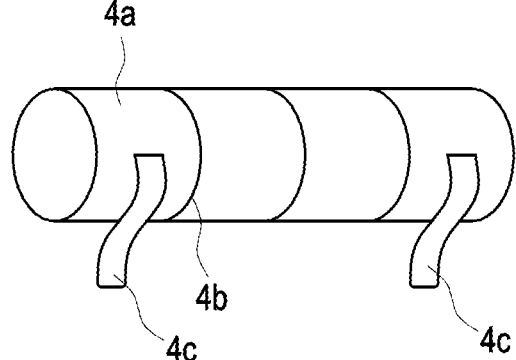
FIG. 2 shows one embodiment of the warning cover sleeve.

FIG. 2 shows one embodiment of the cylindrical warning cover sleeve 4. This consists of a textile 4a, being arranged in signal colors and optionally being multicolored, at least one wire 4b, running on the periphery of the cylinder of the sleeve and giving it mechanical strength, and velcro straps 4c arranged in proximity to the ends of the sleeve 4, with which the sleeve 4 can be secured in any given position on the charging cable 2. In one embodiment, the wire 4b runs in a spiral on the periphery of the sleeve 4.

German patent application no. 10 2021 123321.6, filed Sep. 9, 2021, to which this application claims priority, is hereby incorporated herein by reference, in its entirety. Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A vehicle charging cable, comprising:
a vehicle charging plug configured to charge an electrically driven motor vehicle, wherein the vehicle charging plug includes:
at least one warning light integrated in the vehicle charging plug; and
a brightness sensor which is adapted to measure an ambient brightness and to activate the at least one warning light of the charging plug when the measured ambient light falls below a limit value to illuminate the at least one warning light during charging of the electrically driven motor vehicle.

2. The vehicle charging cable according to claim 1, wherein a power supply of the at least one warning light comes via a pole on the vehicle charging plug.

3. The vehicle charging cable according to claim 1, wherein a power supply of the at least one warning light comes via a separate plug connection with the electrically driven motor vehicle.

4. The vehicle charging cable according to claim 1, wherein a power supply of the at least one warning light comes from a battery which is located in a battery compartment integrated in the vehicle charging plug.

5. The vehicle charging cable according to claim 1, wherein the vehicle charging cable comprises a warning cover sleeve which is movable along an entire length of the vehicle charging cable.

6. The vehicle charging cable according to claim 5, wherein the warning cover sleeve has a variable length.

7. The vehicle charging cable according to claim 5, wherein the warning cover sleeve comprises a multicolored textile.

8. The vehicle charging cable according to claim 5, wherein the warning cover sleeve comprises at least two velcro straps with which the warning cover sleeve can be secured in a desired position on the vehicle charging cable.

9. A method for charging an electrically driven motor vehicle, the method comprising:
making use of a vehicle charging cable that comprises a vehicle charging plug including at least one integrated warning light and a brightness sensor which is adapted to measure an ambient brightness and to activate the at least one warning light when the measured ambient light falls below a limit value;
activating the at least one warning light integrated in the vehicle charging plug of the vehicle charging cable when the ambient brightness is less than the limit value; and
charging the vehicle via the vehicle charging cable while the at least one warning light is activated.

10. A method for charging an electrically driven motor vehicle making use of a charging cable with charging plug including at least one integrated warning light and a brightness sensor which is adapted to measure an ambient brightness and to activate the at least one warning light when the measured ambient light falls below a limit value, the method comprising:
moving a warning cover sleeve of the charging cable to a position of the charging cable where the charging cable constitutes a particularly dangerous place for passersby, and securing the warning cover sleeve there.

* * * * *